Nov. 29, 1955 — A. J. GUDGE ET AL — 2,724,863
METHOD AND APPARATUS FOR MANUFACTURING COLLAPSIBLE CONTAINERS
Filed Feb. 6, 1953

INVENTORS
Alfred J. Gudge
William E. Burman
By Watson, Cole, Grindle & Watson
ATTORNEYS United States Patent Office 2,724,863
Patented Nov. 29, 1955

2,724,863

METHOD AND APPARATUS FOR MANUFACTURING COLLAPSIBLE CONTAINERS

Alfred James Gudge and William Edward Burman, London, England, assignors to Flexipac Limited, London, England, a British company Application February 6, 1953, Serial No. 335,424

Claims priority, application Great Britain July 5, 1952

5 Claims. (Cl. 18—38)

This invention is for improvements in or relating to collapsible containers and has particular reference to collapsible containers of the type, hereinafter referred to as the type described, consisting of a collapsible tubular body portion of flexible synthetic thermoplastic material having at one end a head portion of similar material containing an extrusion orifice for dispensing the contents, the other end being permanently closed by welding or by other sealing means. The extrusion orifice in the head portion may be temporarily closed by a screw cap or may be integrally closed by a plastic plug which may be pierced or cut off to allow the discharge of the contents. The container may be filled through the end remote from the head portion before that end is sealed. Alternatively, the end portion may be closed before filling and the contents inserted in the tube via the extrusion orifice.

It has previously been proposed to form a container of the type described from plastic material by forming the head portion and the tubular body portion separately and thereafter welding them together.

We have now found that a container of the type described may be made by moulding the head portion and welding a preformed tubular body portion thereto in one operation.

According to the present invention there is provided a process for the manufacture of a collasible container of the type described from a preformed tubular body portion which comprises moulding a head portion in abutting relationship to an end of the tubular body portion, the head portion being welded to the tubular body portion immediately upon formation, said moulding and welding being effected by high frequency electric heating.

The preformed tubular body is preferably manufactured in one stage by an extrusion process and it may then be cut off into suitable lengths. Alternatively, the tubular body may be manufactured from plastic sheet material the edges thereof being welded together to form a tube e. g. by high frequency electric heating.

The preformed tubular body and the head portion may be of any suitable synthetic thermoplastic material, for example, polyvinyl chloride or polyethylene.

A preferred method of carrying the present invention into effect comprises fitting the preformed tubular body portion over a male die member, inserting a charge of synthetic thermoplastic material for moulding the head portion into a female die member adapted to co-operate with the male die member to form the head portion and thereafter bringing the male die member and female die member into such a position that the head portion is moulded abutting an end of the tubular body portion, the head portion being welded to the tubular body portion immediately upon formation.

The charge of synthetic thermoplastic material for moulding the head portion of the container may be in powder or pellet form.

The present invention also includes apparatus for carrying out a process for the manufacture of a collapsible container according to the present invention which apparatus comprises a male die member located coaxially with and substantially vertically above a co-operating female die member, said die members comprising the electrodes for the high frequency electric heating.

Following is a description by way of example and with reference to the accompanying drawings of one method of carrying the present invention into effect.

Figure 1:
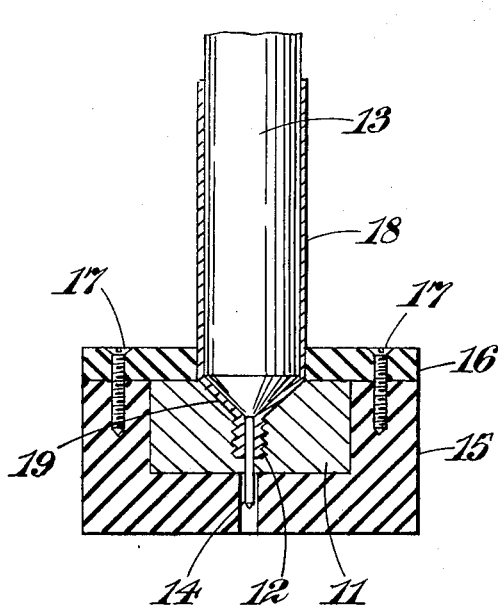
Figure 1 is a vertical cross-sectional view of the apparatus employed showing the arrangement just after the completion of the moulding and welding operation.

Referring to Figure 1 of the drawings, a female die member 11 machined from brass has a declivity in it tapped with a thread 12 of a form which it is desired to impart to the head portion of the container. A cooperating tubular male die member 13 also of brass is located coaxially with and vertically above the female die member 11 and has a pointed downwardly extending portion 14 which serves to locate and position the male die member in the female die member. The die members act as electrodes in a high frequency electrical heating process and are connected to a high frequency generator. The female die member is surrounded by insulating material in the form of a cylinder 15 having part of its centre cut away and an annular ring 16 both secured together by screws 17. The end of the male die member 13 passes through the centre of the annular ring 16.

To form the container a preformed tube 18 of polyvinyl chloride is cut to a suitable size and is slid over the outside of the tubular die member 13. A pellet of polyvinyl chloride is then inserted into the declivity in the female die member 11 and the male die member is lowered into the female die member by the application of pressure. At a suitable time during the downward stroke of the die member 13 a high frequency electric current is applied to the two die members. This electric current melts the polyvinyl chloride pellet and the head portion 19 of the container is thereby formed by heat and pressure, the pointed end 14 of die member 13 serving to form the extrusion orifice. As soon as the head portion 19 is formed it abuts the molten lower end of the preformed tube 18 and is welded thereto. The high frequency electric current is switched off and the male die member and finished tube finally withdrawn and separated.

Figure 2:
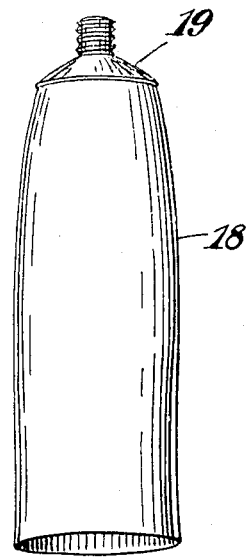
Figure 2 is a perspective view of one form of collapsible container prior to filling.

Referring to Figure 2 of the drawings, this shows the moulded and welded tube after withdrawal from the apparatus and before filling and closing.

Figure 3:
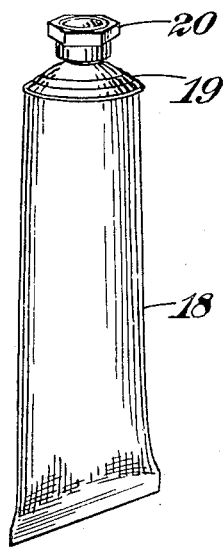
Figure 3 is a perspective view of one form of collapsible container after filling.

Figure 3 shows the container of Figure 2 after it has been filled and the end remote from the head portion sealed by high frequency electric welding. A removable cap 20 of hard synthetic plastic material is screwed in position covering the extrusion orifice.

Figure 4:
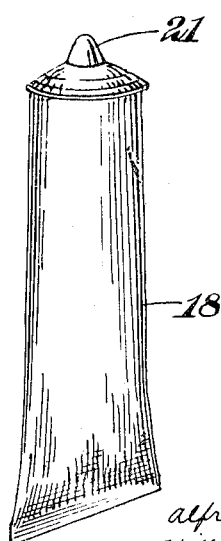
Figure 4 is a perspective view of a further form of container after filling.

Figure 4 shows a filled container similar to that of Figure 3 but in which the screw-threaded head and removable screw cap have been replaced by a plug 21 which may be pierced to discharge the contents of the tube. The plug 21 is an integral moulding with the head portion.

If desired, in the form of container having a screw-threaded head the extrusion orifice may be initially sealed by a thin film of the plastic material. This may be effected by reducing the length of the pointed end 14 of the male die member 13 so that it does not project to the end of the head portion.

Containers made in accordance with the present invention constitute a saving in time and material on those containers made by known processes. Furthermore, the head portion and tubular body portion are joined by a strong and durable weld.

We claim:

1. A process for the manufacture of a collapsible container which process comprises preforming a tubular body portion of polyvinyl chloride, fitting the said body portion over a male die member, introducing a charge of polyvinyl chloride for moulding a head portion into a female die member adapted to co-operate with the said male die member to form the head portion and thereafter bringing the male die member and female die member into such a position that the head portion is moulded abutting an end of the tubular body portion, the head portion being welded to the tubular body portion immediately upon formation of the former, said moulding and welding being effected by high frequency heating the male and female die members comprising the electrodes for the high frequency heating.

2. A process for the manufacture of a collapsible container which process comprises preforming a tubular body portion of polyethylene, fitting the said body portion over a male die member, introducing a charge of polyethylene for moulding a head portion into a female die member adapted to co-operate with the said male die member to form the head portion and thereafter bringing the male die member and female die member into such a position that the head portion is moulded abutting an end of the tubular body portion, the head portion being welded to the tubular body portion immediately upon formation of the former, said moulding and welding being effected by high frequency heating the male and female die members comprising the electrodes for the high frequency heating.

3. Apparatus for producing a collapsible container consisting of a flexible tubular body portion of thermoplastic material and a head portion of similar material containing an extrusion orifice, which apparatus comprises a female die member having a declivity therein of a form which it is desired to impart to the head portion of the container and a tubular male die member located coaxially with and vertically above the female die member, said male and female die members constituting electrodes in a high frequency electrical heating process and co-operating to mould the head portion abutting an end of the tubular body portion which is placed in position over the male die member and to weld the tubular body portion to the head portion immediately upon formation of the latter.

4. A process for the manufacture of a collapsible container which process comprises the formation by compression moulding of a head portion of flexible thermoplastic material in abutting relationship to an end of a preformed tubular body portion of similar thermoplastic material, said comression moulding employing the heating effect of a high-frequency electric field which simultaneously softens said end of the body portion whereby both portions are incipiently fused together.

5. A process for the manufacture of a collapsible container which process comprises subjecting one end of a preformed tubular body portion of flexible thermoplastic material to the heating effect of a high-frequency electric field to soften said end, at the same time fusing said softened end to a head portion during the formation of the latter from similar thermoplastic material by compression moulding employing the heating effect of the same high-frequency electric field.

References Cited in the file of this patent

UNITED STATES PATENTS

| 1,754,496 | Barker | Apr. 15, 1930 |
| 2,673,374 | Strahm | Mar. 30, 1954 |

FOREIGN PATENTS

| 511,601 | Great Britain | Aug. 22, 1939 |
| 273,834 | Switzerland | July 2, 1951 |
| 270,613 | Switzerland | Dec. 1, 1950 |

OTHER REFERENCES

Zade: "Wedlign Thermoplastics With High Frequency," Plastics, September 1944, pages 30, 32, 95.